US008668859B2

(12) United States Patent
Pettis

(10) Patent No.: US 8,668,859 B2
(45) Date of Patent: Mar. 11, 2014

(54) AUTOMATED 3D BUILD PROCESSES

(71) Applicant: MakerBot Industries, LLC, Brooklyn, NY (US)

(72) Inventor: Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

(21) Appl. No.: 13/652,608

(22) Filed: Oct. 16, 2012

(65) Prior Publication Data

US 2013/0073073 A1   Mar. 21, 2013

Related U.S. Application Data

(63) Continuation-in-part of application No. 13/314,337, filed on Dec. 8, 2011, which is a continuation-in-part of application No. 12/858,622, filed on Aug. 18, 2010, now Pat. No. 8,282,380.

(51) Int. Cl.
*B28B 1/14* (2006.01)

(52) U.S. Cl.
USPC ........... 264/308; 264/401; 264/405; 425/375; 425/110; 425/113

(58) Field of Classification Search
USPC ........... 264/401, 405, 308; 425/375, 110, 113
See application file for complete search history.

(56) References Cited

U.S. PATENT DOCUMENTS

| 3,090,206 | A | * | 5/1963 | Anders ............................ 62/3.7 |
| 4,097,566 | A | | 6/1978 | Bertin et al. |
| 4,738,605 | A | * | 4/1988 | Aerts et al. ....................... 425/98 |
| 4,943,928 | A | * | 7/1990 | Campbell et al. ............. 700/207 |
| 5,192,559 | A | | 3/1993 | Hull et al. |
| 5,637,175 | A | * | 6/1997 | Feygin et al. ................. 156/264 |
| 5,730,817 | A | | 3/1998 | Feygin et al. |
| 6,129,872 | A | * | 10/2000 | Jang ................................ 264/75 |
| 6,841,116 | B2 | | 1/2005 | Schmidt |
| 7,000,430 | B1 | * | 2/2006 | Fotheringham et al. ....... 65/33.2 |
| 7,231,275 | B2 | | 6/2007 | Silverbrook |
| 7,513,596 | B2 | * | 4/2009 | Silverbrook .................... 347/40 |
| 7,958,236 | B2 | | 6/2011 | Motoyama et al. |
| 8,226,395 | B2 | | 7/2012 | Pax et al. |
| 8,282,380 | B2 | | 10/2012 | Pax et al. |
| 8,286,236 | B2 | | 10/2012 | Jung et al. |
| 8,287,794 | B2 | | 10/2012 | Pax et al. |
| 8,317,508 | B2 | * | 11/2012 | Bokodi et al. ................ 425/375 |
| 2002/0195746 | A1 | * | 12/2002 | Hull et al. ...................... 264/401 |
| 2004/0175450 | A1 | | 9/2004 | Yanagisawa et al. |
| 2004/0232601 | A1 | | 11/2004 | Kundinger et al. |

(Continued)

OTHER PUBLICATIONS

"U.S. Appl. No. 13/292,209, Notice of Allowance mailed Aug. 31, 2012", 15 pages.
"U.S. Appl. No. 12/858,622 Notice of Allowance mailed Aug. 2, 2012", 13 pages.
"U.S. Appl. No. 13/292,369, Notice of Allowance mailed May 11, 2012", 9 pages.
"U.S. Appl. No. 13/292,369, Final Office Action mailed Apr. 25, 2012", 8 pages.
Onagoruwa, Seyi et al., "Fused Deposition of Ceramics (FDC) and Composites", School of Mechanical and Materials Engineering Washington State University Pullman, WA 99164-2920 amitband@wsu.edu, pp. 224-231.

(Continued)

*Primary Examiner* — Joseph S Del Sole
*Assistant Examiner* — David N Brown, II
(74) *Attorney, Agent, or Firm* — Strategic Patents, P.C.

(57) ABSTRACT

A conveyor or other transport mechanism is provided to support multiple, sequential builds from a three-dimensional fabrication machine. The conveyor may be heated/cooled, coated, or otherwise treated to assist in adhesion during a build, as well as removal of objects after a build. Each fabricated object may be automatically removed from the conveyor as the conveyor moves in order to restore a buildable surface for fabrication of additional objects.

18 Claims, 6 Drawing Sheets

(56) References Cited

U.S. PATENT DOCUMENTS

| | | | |
|---|---|---|---|
| 2005/0208168 A1* | 9/2005 | Hickerson et al. | 425/174.4 |
| 2007/0024895 A1 | 2/2007 | Clark | |
| 2008/0309665 A1 | 12/2008 | Gregory, II et al. | |
| 2012/0046779 A1 | 2/2012 | Pax et al. | |
| 2012/0059503 A1 | 3/2012 | Pax et al. | |
| 2012/0059504 A1 | 3/2012 | Pax et al. | |
| 2012/0092724 A1 | 4/2012 | Pettis | |
| 2012/0105903 A1 | 5/2012 | Pettis | |
| 2012/0113457 A1 | 5/2012 | Pettis | |
| 2012/0113473 A1 | 5/2012 | Pettis | |

OTHER PUBLICATIONS

"U.S. Appl. No. 12/858,622, Non-Final Office Action mailed Feb. 14, 2012", 21 pgs.

"U.S. Appl. No. 13/292,369, Non-Final Office Action mailed Feb. 14, 2012", 21 pgs.

"Fabbaloo Personal Manufacturing and 3D Printing, http://fabbaloo.com/blog/2012/1/6/kraftwurxs-patent-available.html" Jan. 29, 2012, all pgs.

Pax, Charles E., "Awesome August Hack-a-thon", http://charlespax.com/2009/08/18/awesome-august-hack-a-thon/[Aug. 5, 2010 12:13:01 PM] Open Source 3D printing research and design, Aug. 18, 2009, all pages.

Pax, Charles E., "Motorized Conveyor Belt Sneak Peak", http://charlespax.com/2010/04/27/motorized-conveyor-belt-sneak-peek/ Open Source 3D printing research and design, Apr. 27, 2010, pp. 1-10.

Pax, Charles E., "MakerBot Thoughts", http://charlespax.com/2009/04/22/makerbot-thoughts/[Aug. 5, 2010 12:10:55 PM] Open Source 3D printing research and design Apr. 22, 2009, all pages.

Pax, Charles E., "Heated Conveyor Belt Build Platform", http://charlespax.com/2010/04/20/heated-conveyor-belt-build-platform/ [Aug. 5, 2010 12:17:26 PM] Open Source 3D printing research and design Apr. 20, 2010, pp. 1-3.

Brockmeier, Oivind, "Automated Loading and Unloading of the Stratasys FDM 1600 Rapid Prototyping System", Thesis submitted to the Faculty of Virginia Polytechnic Institute and State University Mar. 2000, all pgs.

Pax, Charles E., "MakerBot Conveyor Belt", http://charlespax.com/2010/03/17/makerbot-conveyor-belt/[Aug. 5, 2010 12:14:05 PM] Open Source 3D printing research and design Mar. 17, 2010, all pages.

Pax, Charles E., "MakerBot Thoughts 3", http://charlespax.com/2010/01/27/makerbot-thoughts-3/[Aug. 5, 2010 12:13:39 PM] Open Source 3D printing research and design Jan. 27, 2010, all pages.

"U.S. Appl. No. 13/314,337, Non-Final Office Action mailed Jul. 31, 2013", 37 pages.

* cited by examiner

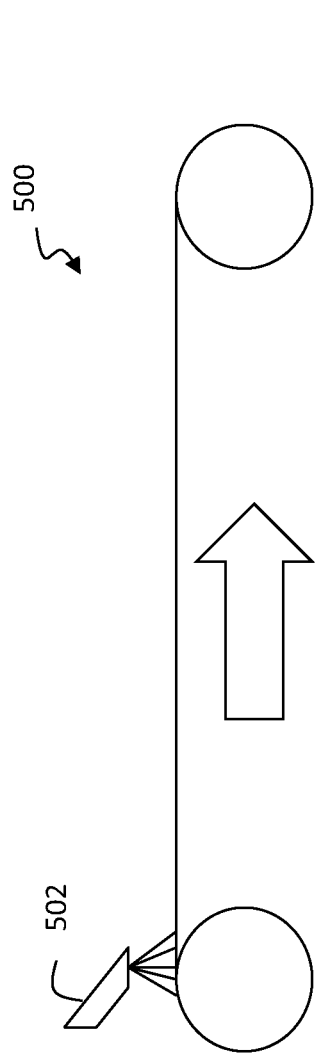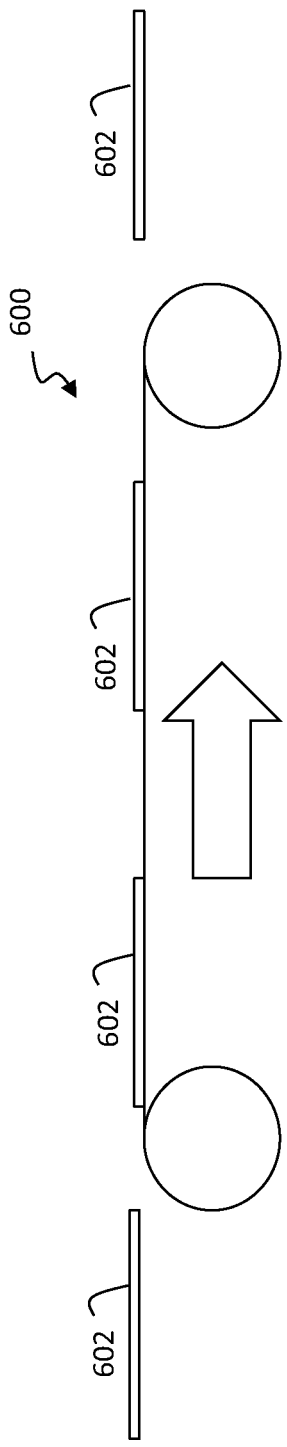

AUTOMATED 3D BUILD PROCESSES

RELATED APPLICATIONS

This application is a continuation-in-part of U.S. patent application Ser. No. 13/314,337 filed Dec. 8, 2011, which is a continuation-in-part of U.S. patent application Ser. No. 12/858,622, filed on Aug. 18, 2010 (now U.S. Pat. No. 8,282,380 issued Oct. 9, 2012), the entire content of each of these applications is hereby incorporated by reference.

BACKGROUND

The invention relates to an automated three-dimensional build process in which objects are automatically removed from a build surface in order to permit continuous fabrication of multiple objects.

A variety of three-dimensional fabrication techniques have been devised to support rapid prototyping from computer models. In general, these techniques have been refined over the years to increase accuracy, working volume, and the variety of build materials available in a rapid prototyping environment. While these increasingly sophisticated and expensive machines appear regularly in commercial design and engineering settings, a more recent trend has emerged toward low-cost three-dimensional prototyping devices suitable for hobbyists and home users. These devices typically provide smaller build volumes and faster build times, and as a result they are used to fabricate more numerous, smaller devices, which may require frequent user intervention to retrieve completed objects from the working volume. Thus, a need has emerged for prototyping machines that support the continuous fabrication of multiple objects in this context.

SUMMARY

A conveyor or other transport mechanism is provided to support multiple, sequential builds from a three-dimensional fabrication machine. The conveyor may be heated/cooled, coated, or otherwise treated to assist in adhesion during a build, as well as removal of objects after a build. Each fabricated object may be automatically removed from the conveyor as the conveyor moves in order to restore a buildable surface for fabrication of additional objects.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the invention.

FIG. 5 is a cross section of a conveyor with a sprayed-on working surface.

FIG. 6 is a cross-section of a conveyor with a removable and replaceable surface.

DETAILED DESCRIPTION

Described herein are devices and methods for automating a three-dimensional build process to accommodate continuous fabrication of multiple objects without user intervention. It will be understood that while the exemplary embodiments below emphasize fabrication techniques using extrusion, the principles of the invention may be adapted to a wide variety of three-dimensional fabrication processes, and in particular additive fabrication processes including without limitation selective laser sintering, fused deposition modeling, three-dimensional printing, and the like. All such variations that can be adapted to use with a continuous or similarly automated fabrication process as described herein are intended to fall within the scope of this disclosure. It should also be understood that any reference herein to a fabrication process such as three-dimensional printing is intended to refer to any and all such additive fabrication process unless a narrower meaning is explicitly stated or otherwise clear from the context.

Figure 1:
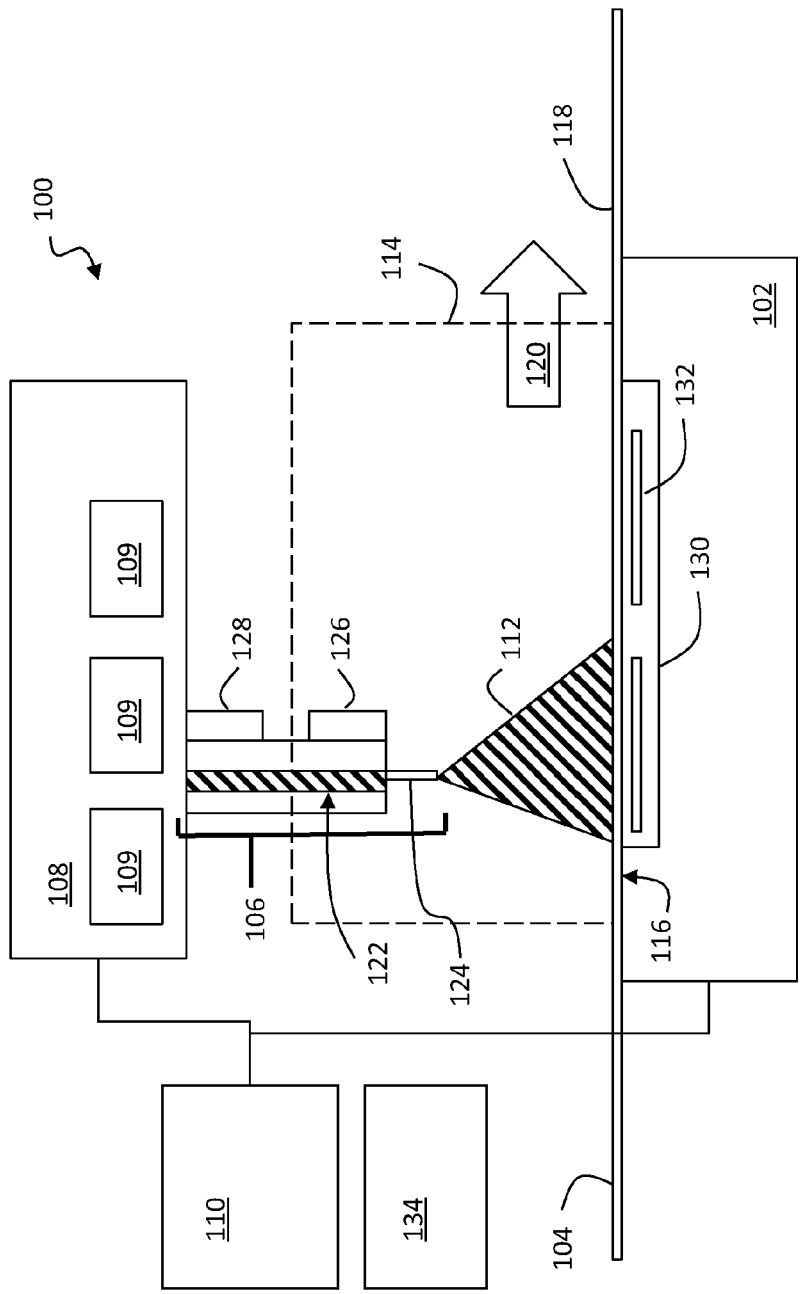
FIG. 1 is a block diagram of a three-dimensional printer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are shown and described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to seven thousandths of an inch, or any other thickness that permits the sheet 118 to follow the path 120 of the conveyer 104. For example, with sufficiently strong material, the sheet 118 may have a thickness of one to three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyer 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be suitably adapted to use with the printer 100 described herein.

By way of example and not limitation, the conveyor 104 may be affixed to a bed that provides x-y positioning within the plane of the conveyer 104, while the extruder 106 can be independently moved along a z-axis. As another example, the extruder 106 may be stationary while the conveyor 104 is x, y, and z positionable. As another example, the extruder 106 may be x, y, and z positionable while the conveyer 104 remains fixed. In yet another example, the conveyer 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104.

In another aspect, the other hardware 134 may include a sensor to detect a presence of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume and analyze the image to evaluate a position of the object. This sensor may be used for example to ensure that the object 112 is removed from the conveyor 104 prior to beginning a new build at that location on the working surface. Thus the sensor may be used to determine whether an object is present that should not be, or to detect when an object is absent. The feedback from this sensor may be used by the controller 110 to issue processing interrupts or otherwise control operation of the printer 100.

In another aspect, the other hardware 134 may include a sensor that detects a position of the conveyer 104 along the path. This information may be obtained by an encoder in a motor that drives the conveyer 104, or using any other suitable technique such as a sensor and corresponding fiducials (e.g., visible patterns, holes, or areas with opaque, specular, transparent, or otherwise detectable marking) on the sheet 118. In another aspect, the sensor may include a heater (instead of or in addition to the thermal element 130) to heat the working volume such as a radiant heater or forced hot air to maintain the object 112 at a fixed, elevated temperature throughout a build.

Figure 2:
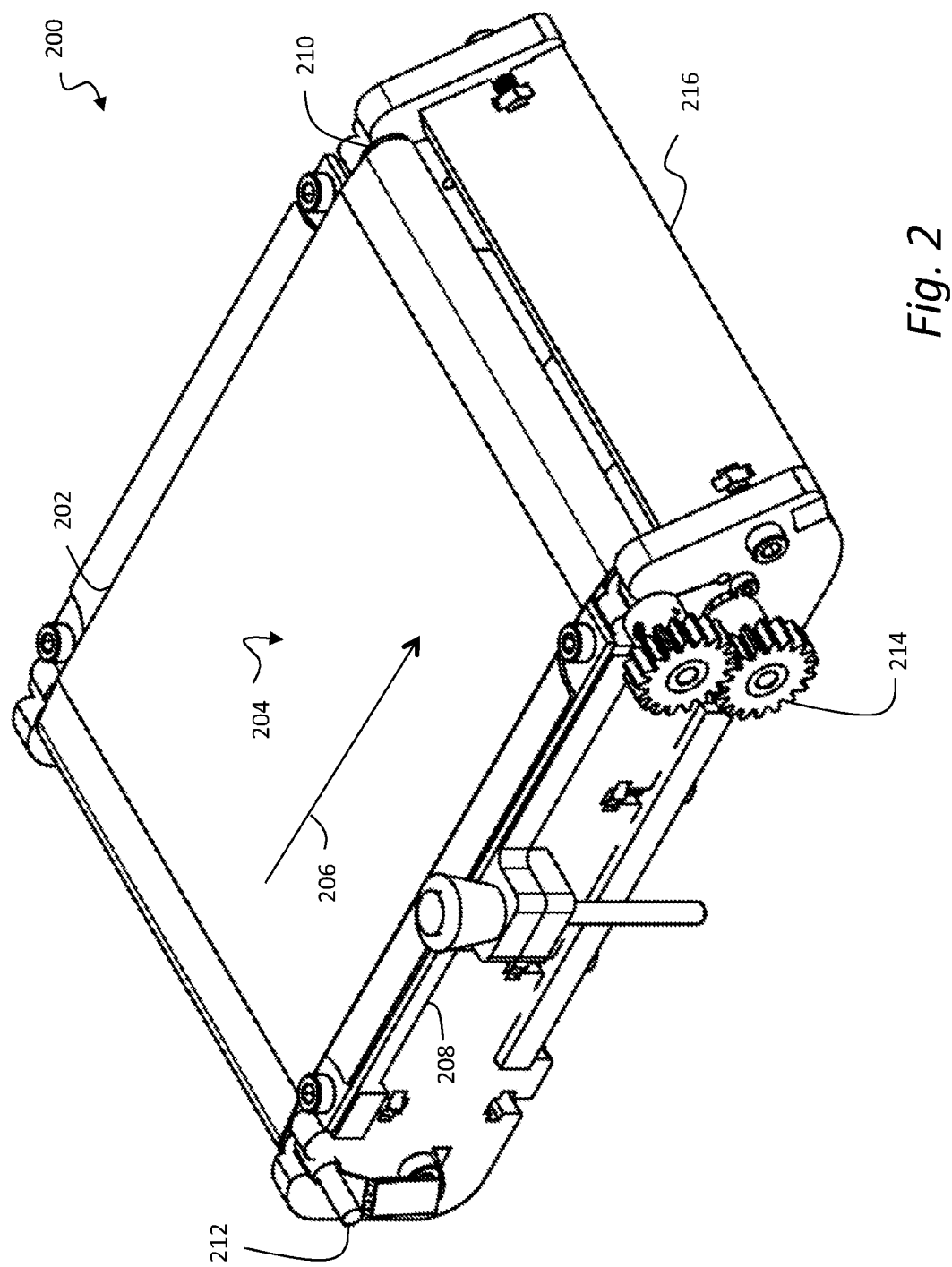
FIG. 2 is an isometric view of a conveyer for an automated build process.

FIG. 2 is an isometric view of a conveyer for an automated build process. As described above, the conveyer 200 includes a sheet 202 of material that provides a working surface 204 for three-dimensional fabrication. As depicted, the conveyer may form a continuous path 206 about a build platform 208 by arranging the sheet 202 as a belt or the like. More specifically, the path 206 may move parallel to the surface of the build platform 208 along the top of the build platform 208 (from left to right in FIG. 2). The sheet 202 may then curve downward and around a roller 210 and reverses direction underneath the build platform 208, returning again at an opposing roller 212 to form a loop about the build platform 208.

The roller 210 may be coupled by gears 214 or the like to a motor (not shown) to move the sheet 202 of material. The motor may be controlled by a controller (such as the controller 110 described above) to control movement of the sheet 202 of material in a build process.

The conveyer 200 may include a scraper 216 to physically separate a completed object from the conveyer 200 based upon a relative movement of the sheet 202 of material of the conveyor 200 to the scraper 216. In general, adhesion of an object to a working surface maintains the object within the coordinate system of the printer during a build in order to maintain precision of the build process. Where good adhesion is achieved during a build, dislodging the completed object from the working surface may require significant force. Thus in order to ensure the availability of a continuous working surface, the conveyer 200 may enforce physical separation of the object from the working surface by passing the sheet 202 of material by the scraper 216 to dislodge the object. While the scraper 216 is depicted below the working surface of the sheet 202, it will be readily understood that a variety of positions and orientations of the scraper 216 may achieve similar results. Thus for example, the scraper 216 may extend vertically above or below the sheet 202, horizontally from the sheet 202 or in any other suitable orientation. It will also be appreciated that while the scraper 216 is depicted in an orientation perpendicular to the path 206, the scraper 216 may be angled in order to also urge a completed object off the sheet 202 in any desired direction, such as to a side of the working surface where a chute or receptacle may be provided to catch and store the completed object. In some embodiments, the conveyer 200 can translate to a side of the printer 100, so that urging the completed object off the sheet 202 causes the competed object to depart the printer 100. Still more generally, the term 'scraper' should be understood as describing a non-limiting example of a physical fixture to remove an object from the sheet 202, and that many other shapes, sizes, orientations, and the like may also or instead be employed as the scraper 216 described herein without departing from the scope of this disclosure.

Figure 3:
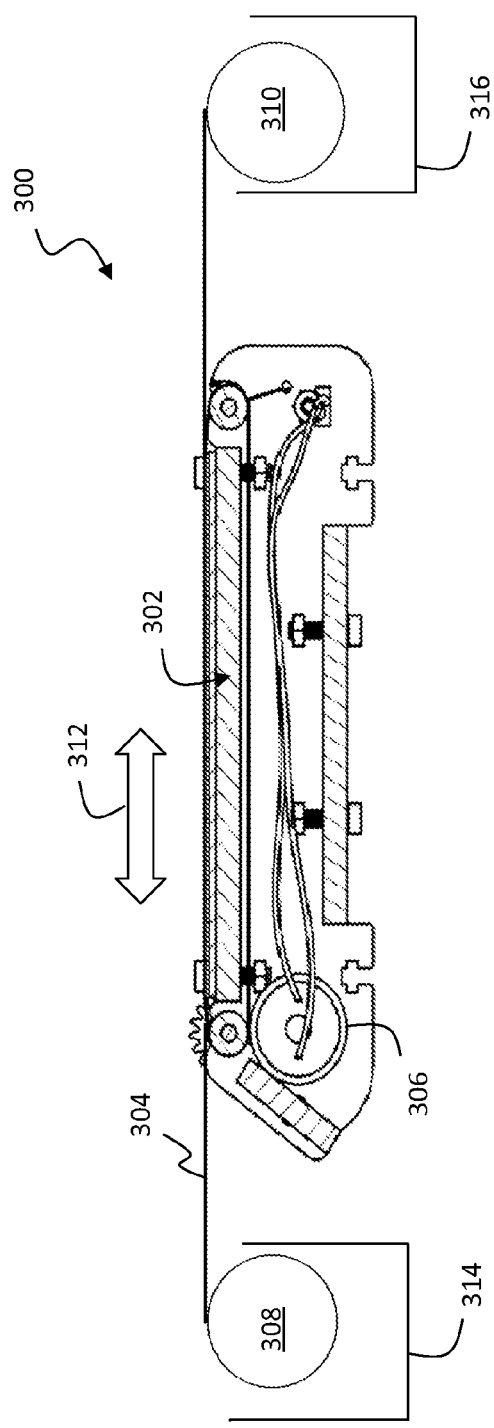
FIG. 3 is a cross-section of a conveyor.

FIG. 3 is a cross-section of a conveyer. As generally described above, the conveyor 300 may include a build platform 302 and a sheet 304 of material passing above the build platform 302 to provide a continuous working surface for an automated build process. In general, a motor 306 or other electro-mechanical drive mechanism may control movement of the sheet 304 across the build platform 302. While the arrangement described above generally employs a belt arrangement that travels around the build platform 302, other arrangements such as a scrolling sheet may also or instead be employed.

For example, the sheet 304 may extend past the build platform 302, and may scroll across the build platform 302 between a first spool 308 and a second spool 310. The sheet 304 may scroll bi-directionally across the build platform 302 as generally depicted by an arrow 312. As used herein, the term 'scroll' or 'scrolling' is intended to refer to a planar motion of the build surface across the build platform 302 from one spool to another. Each end of the moving surface may also or instead include a container bin, box, or other receptacle to provide or receive the sheet 304 of material in a one way feeding mechanism in which the sheet 304 is sacrificially consumed or otherwise used during a build process. Thus the sheet 304 may scroll between a first container 314 and a second container 316, or more generally the conveyer 300 may include a variety of rollers, gears, motors, spools, and the like to feed the sheet 304 in a bi-directional and/or one-way arrangement to provide a continuous working surface for an automated build process.

A variety of surfacing techniques may be used for the sheet 304 of material that provides a working surface for a build.

Figure 4:
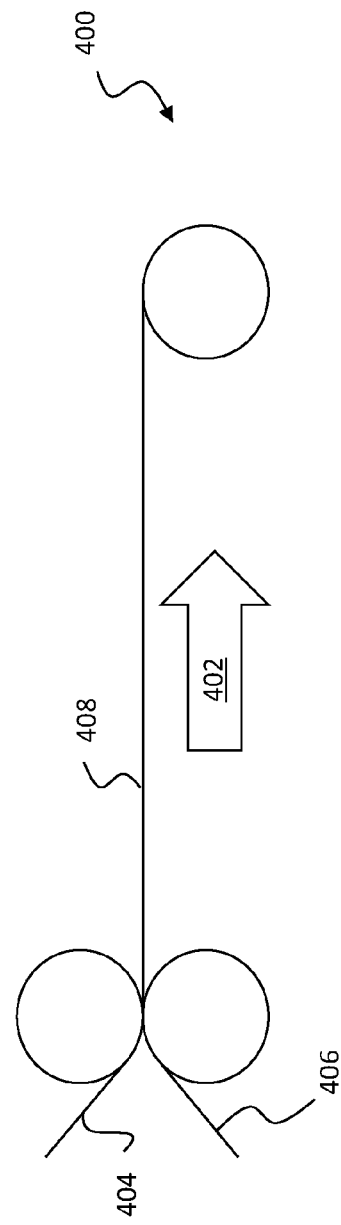
FIG. 4 is a cross-section of a conveyor with a laminated working surface.

FIG. 4 is a cross-section of a conveyer with a laminated working surface. In general, the conveyer 400 may move from left to right, as illustrated by an arrow 402. As the conveyer 400 moves, a second sheet 404 may be laminated to the sheet 406 of material of the conveyer 400 to form a laminated working surface 408. The sheet 406 of the conveyer 400 may be fed from a source such as a spool, or travel in a continuous belt as described above, or take any other path as generally described above. The second sheet 404 may be a detachable surface such as an adhesive tape or other thin film that can receive build material (such as completed object) on a top surface, with a bottom surface that can readily detach from the sheet 406 of the conveyer 400 to facilitate removal of completed objects.

FIG. 5 is a cross section of a conveyer with a sprayed-on working surface. The conveyer 500, which may include any of the conveyors described above, may include a resurfacer 502 such as a spray head, wetted roll, or any other assembly or collection of assemblies to apply a detachable film or surface to the conveyor 500 before the surface of the conveyor 500 moves into a working volume for a build. While the resurfacer 502 is depicted as a spray nozzle, it will be appreciated that the resurface may include any device(s) suitable for applying a detachable surface to the conveyor 500, including without limitation the laminator described above. It will further be appreciated that the resurfacer 502 may be used with one-way or bi-directional working surfaces, and other surface treatment devices may also be used such as a surface cleaner to remove any detachable surface(s) before resurfacing, curing devices that provide light, heat, pressure or the like to cure the detachable surface into a desired state, and so forth.

FIG. 6 is a cross-section of a conveyer with a removable and replaceable surface. The conveyer 600 may convey one or more removable and replaceable build surfaces 602, each of which is removably and replaceably attached to the conveyor 600 using, e.g., snaps, clips, hook-and-loop (e.g. VELCRO) fasteners, adhesives, or any other re-usable fastening device(s) or material(s). Each one of the removable and replaceable build surfaces 602 may be temporarily affixed to the conveyor 600 by hand or by some automated robotic or similar process, and may be removed from the conveyor 600 after a build is complete. A build surface 602 may then be cleaned and recycled for use in a subsequent build process.

Figure 7:
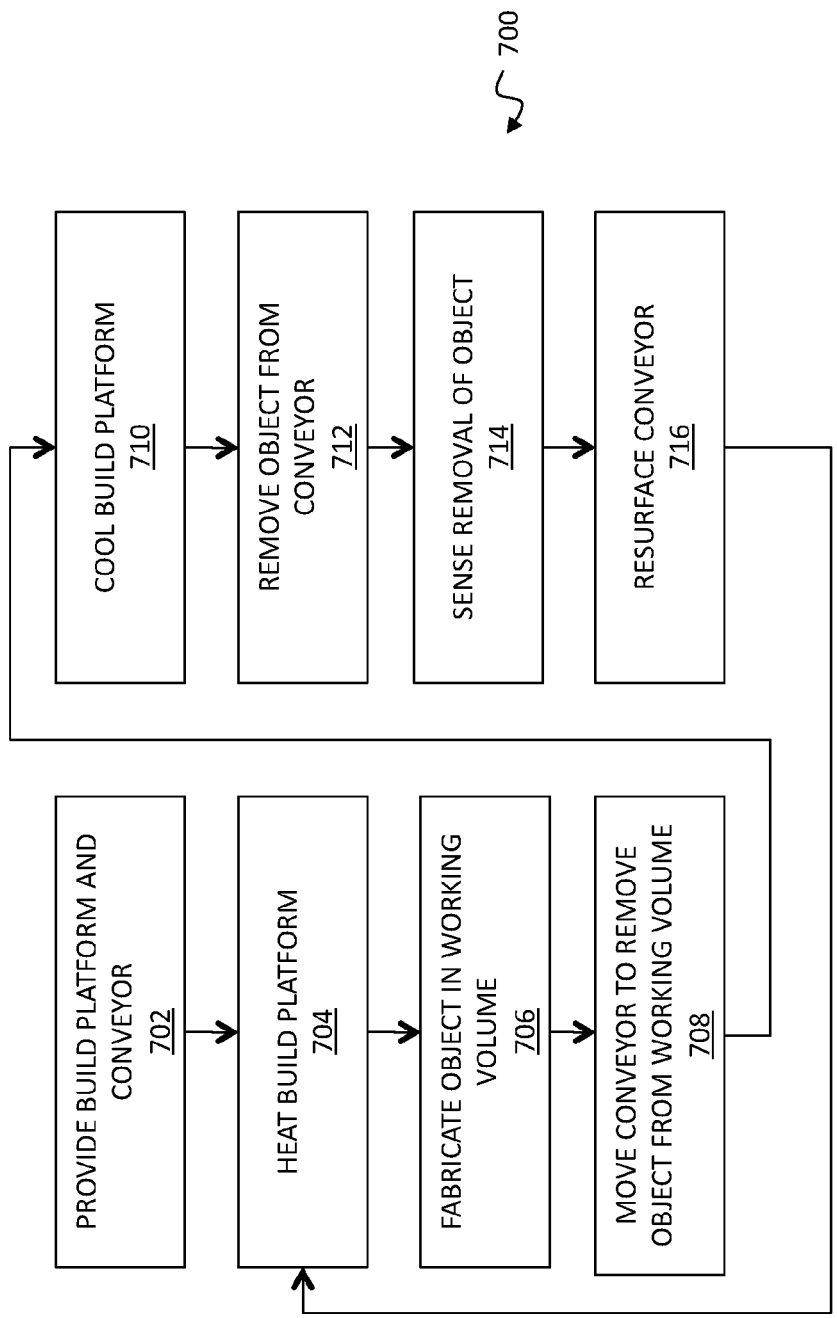
FIG. 7 shows a process for automated three-dimensional fabrication.

FIG. 7 shows a process for automated three-dimensional fabrication using the apparatus described above.

As shown in step 702, the process 700 may begin with providing a build platform having a surface that is substantially planar and a conveyor formed of a sheet of material that moves in a path passing through a working volume proximal to the surface of the build platform. The build platform and conveyor may, for example, be any of the build platforms and conveyors described above.

As shown in step 704, the process 700 may include heating the build platform prior to fabricating the object. This may include heating the build platform may be heated to a minimum of about one hundred degrees Celsius, about one-hundred ten degrees Celsius, or any other temperature that increases an adhesive force between the sheet of material (of the conveyor) and the object. The build platform may be actively heated by applying current to one or more resistive elements within the build platform, or using any other suitable heating technique such as thermoelectric heating devices, infrared radiation, and so forth. In another aspect, the build platform may be heated indirectly by heating the working volume with heated air or the like. A thermistor or other temperature sensing device may be provided on the build platform, or otherwise positioned to measure a temperature of the build platform so that a desired target temperature can be obtained and/or maintained.

As shown in step 706, the process 700 may include fabricating an object on the conveyor in the working volume. Fabricating the object may include creating the object from a number of layers of a build material, each one of the number of layers having a two-dimensional shape corresponding to a cross-section of the object. More generally, any technique for fabricating three-dimensional objects from a deposited material (or multiple materials) may be suitably adapted to continuous fabrication using the systems and methods described herein.

As shown in step 708, the process 700 may include moving the conveyor to remove the object from the working volume. This may include scrolling, sliding, or otherwise moving the working surface of the conveyor from the working volume using, e.g., any of the techniques described above. Moving the conveyor may include any of the techniques described above. For example, moving the conveyor may include moving the conveyor in a continuous path about the build platform in a belt configuration or the like. Moving the conveyor may include scrolling the conveyor through the working volume, such as from a first spool to a second spool. It will also be understood that moving the conveyor may include moving the conveyor bi-directionally through the working volume in a process where, e.g., an object is moved out on one side while a usable working surface is moved in on the other, after which a complementary set of operations are performed with another completed object moved out on the other side.

As shown in step 710, the process 700 may include cooling the build platform after fabricating the object. Cooling may include cooling to a maximum temperature of about forty degrees Celsius, or to any other temperature that reduces a bonding force between the sheet of material (of the conveyor) and the object. Cooling may include passively cooling the build platform over time, such as by including a dwell or similar pause in fabrication prior to removing the object from the conveyor. Cooling may also or instead include actively cooling the build form using, e.g., refrigerants, expanding gas, forced cool air, thermoelectric cooling devices, or any other suitable cooling technique.

As shown in step 712, the process 700 may include removing the completed object from the conveyor. In many build processes, a build material may be deposited in a molten, uncured, or other liquid state that is later hardened into a completed object with a rigid form having a bottom surface mated to the working surface of the conveyor. When the substantially planar sheet of material travels around a curved surface (such as the rollers described above), the rigid, planar bottom of the completed object mechanically detaches from the sheet and breaks any adhesion forces bonding the object to the sheet. Thus the moving conveyor may assist in separating a completed object from the working surface of the conveyor. For example, moving the conveyor may include moving the sheet material around a curved surface that physically separates the object from the conveyor. More generally, moving the conveyor may include moving the sheet of material around a convex path, thereby imparting a convex surface to the sheet of material that mechanically separates a substantially planar mating surface of the object. In another aspect, moving the conveyor may also or instead include moving the conveyor past a scraper that moves the object from the conveyor. The scraper, which may be any of the scrapers described above, may physically detach the object from the conveyor, and/or may be angled relative to a path of the conveyor, whereby the scraper slides the object off the conveyor as the conveyor moves. It will be understood that while a curved path and/or a scraper are two techniques that work conveniently with a belt-type conveyor as described above, numerous other techniques may be suitably adapted to use with the methods and systems described herein including without limitation robotic arms to pick objects from the conveyor, sweepers that brush or scrape across the top of a stationary conveyor to clear objects there from, and so forth. All such techniques for removing an object that would be apparent to one of ordinary skill in the art are intended to fall within the scope of this disclosure.

As shown in step 714, the process 700 may include sensing a removal of the object from the conveyor. This may, for example, include passing the sheet of material by an optical sensor in a beam-breaking configuration, or capturing an image of the working surface and analyzing the image to determine the presence or absence of the object. This may also include the use of mechanical switches/sensors that physically detect an object and convert the presence of the object into electrical signals that can be received and processed by the controller or other processing circuitry.

As shown in step 716, the process 700 may optionally include resurfacing the conveyor and returning the working surface to the working volume where a new object may be fabricated. In some embodiments, an object is fabricated directly on the conveyor. In such embodiments, the working surface may be returned to the working volume without resurfacing. In other embodiments, a sacrificial layer or material is provided on top off the conveyor. Where the build surface detaches, the conveyor may be resurfaced. This may generally include adding a detachable surface to the conveyor to receive an object being fabricated using, for example, any of the resurfacers or resurfacing techniques described above. Where removable and replaceable rigid build surfaces are employed, resurfacing may include removably attaching a rigid build surface to the conveyor. In such embodiments, the process 700 may further include moving the rigid build surface into the working volume and fabricating the object on the rigid build surface. In other embodiments where a source of single-use material is provided for a working surface, the process 700 may include removing the used working surface from the working volume and moving a new working surface into the working volume, such as where a sheet of material is fed continuously from a spool or other dispenser.

The process 700 may then return to step 704 and repeat with a new object. Thus in one aspect the process 700 may include fabricating a plurality of consecutive objects sequentially on the conveyor.

It will be appreciated that the process 700 described above is provided by way of non-limiting example. Numerous variations are possible, and each of the steps may be modified, omitted, or changed in order, and new steps may be added, all without departing from the scope of this disclosure. For example, steps such as sensing removal of an object may be omitted entirely. Where the process 700 does not employ a detachable surface, the resurfacing step may also be omitted. At the same time, the process 700 may be performed in parallel such that fabrication of a second object begins before a previously-completed object has been removed from the conveyor, e.g., while the previously-completed object is cooling in an area outside the working volume. Similarly, cooling may be performed before or after an object is removed from the working volume. In another aspect, heating and cooling of the build platform may be omitted entirely, or heating/cooling may be performed on a detachable surface of the conveyor independent of the build platform. Other variations will also be apparent, and may be adapted to use with the process 700 described above.

The process 700, or portions of the process 700, may be embodied in computer executable code stored in a non-transitory computer readable medium (such as a compact disc, hard drive, volatile or nonvolatile memory, etc.) that, when executing on one or more computing devices such as any of the processors or processing circuitry described herein, performs some or all of the steps described above. In such embodiments, it will be understood that the object may be described in a computer model such as a computer-automated design model, a stereolithography file, or any other useful computerized representation, which may in turn be converted into a set of tool instructions that can be applied directly by a controller or the like to fabricate a physical realization of the object. Thus 'fabrication' as described herein may also include processing a computerized representation of an object to obtain tool instructions for a three-dimensional printer or other fabrication device.

Figure 8:
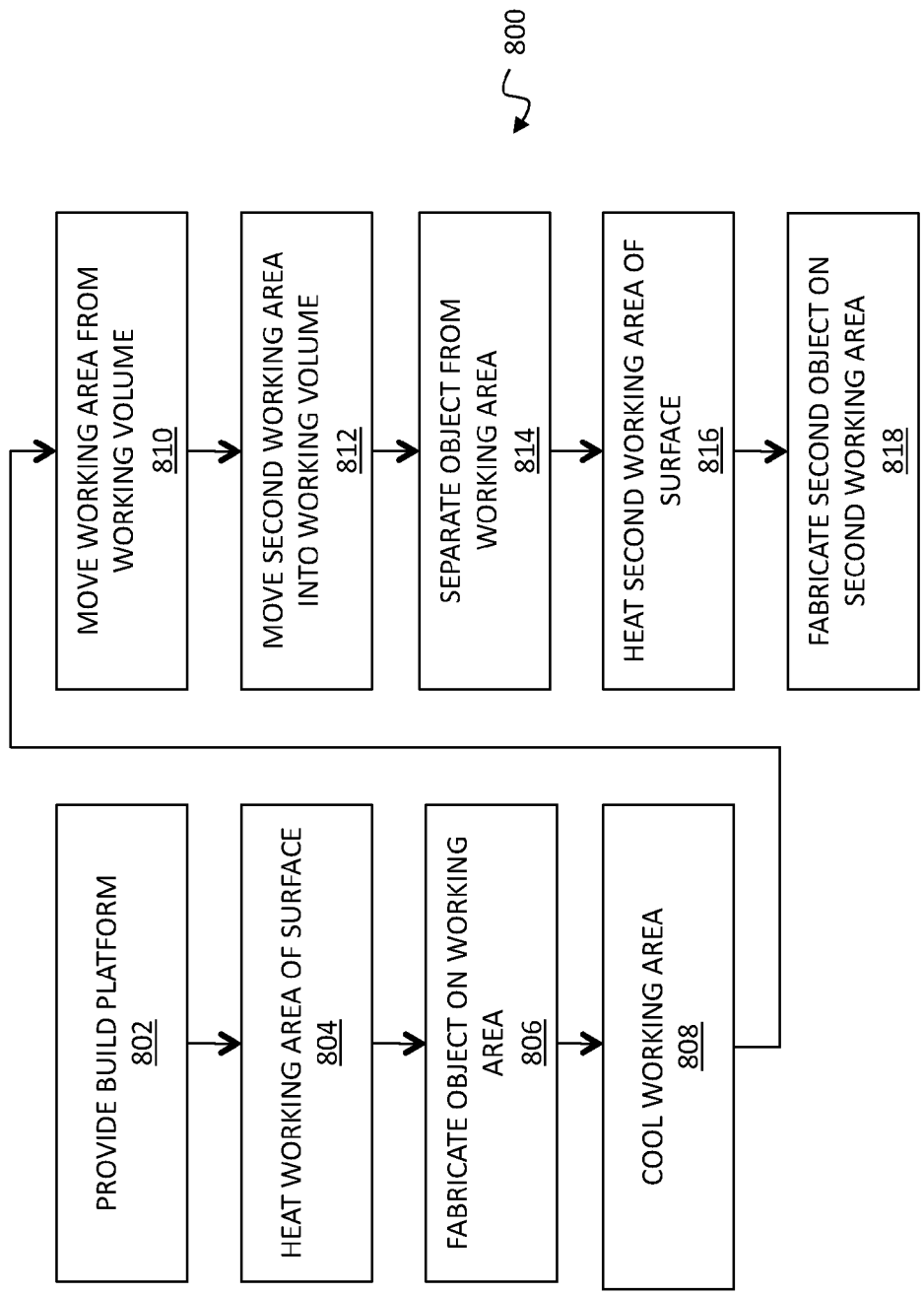
FIG. 8 shows a process for automated three-dimensional fabrication.

FIG. 8 shows a process 800 for automated fabrication of a three-dimensional object. In the process 800 of FIG. 8, an elongated build platform is provided that extends beyond the working volume to permit processing of multiple objects in a sequential batch.

As shown in step 802, the process 800 may begin with providing a rigid build platform having a surface that is substantially planar. The rigid build platform may pass through and extend from the side(s) of a working volume of a three-dimensional printer. In general, the build platform provides numerous, separate working surfaces that can be used sequentially within the working volume of the printer to fabricate a number of objects continuously (i.e., without human intervention).

As shown in step 804, the process 800 may include heating a working area of the surface of the rigid build platform within the working volume. The rigid build platform may include a number of separate, independently controllable heating elements to provide independent control over heating and/or cooling in different areas of the platform. Thus for example, one area of the surface within the working volume may be heated before and/or during a build, while another area of the surface with a completed object that has been removed from the working volume may be concurrently cooled prior to removal of the completed object from the platform.

As shown in step 806, the process 800 may include fabricating an object on the working area. In one fabrication technique, fabricating may include creating the object from a number of layers of a material, each one of the number of layers having a two-dimensional shape corresponding to a cross-section of the object. More generally, fabricating may include fabricating using any of the additive fabrication techniques described above, or any other similar technique that can be adapted to use with an enlarged build platform as described herein.

As shown in step 808, the process 800 may include cooling the working area.

As shown in step 810, the process 800 may include moving the working area out of the working volume.

As shown in step 812, the process 800 may include moving a second working area of the surface into the working volume. This may occur concurrently with step 810 through movement of the rigid build platform through the working volume to present different working areas of the platform to the working volume.

As shown in step 814, the process 800 may include physically separating the object from the working area. At this time, the working area is cleared. The working area may also be resurfaced using any of the techniques described above. The working area may then be moved back into the working volume where the process may return to step 804 and the build platform may be heated for fabrication of another object.

As shown in step 816, the process 800 may include heating the second working area of the surface, which may occur before, during, or after removal of the object in step 812.

As shown in step 818, the process may include fabricating a second object on the second working area. Thus any number of objects may be sequentially fabricated without human intervention.

As with the process 700 of FIG. 7, it will be understood that the process 800 described above is provided by way of non-limiting example. Numerous variations are possible, and each of the steps may be modified, omitted, or changed in order, and new steps may be added, all without departing from the scope of this disclosure. This may, for example, include the addition of many of the steps of process 700 such as resurfacing or sensing the presence of an object on a working area. By way of further example, the rigid build platform may include three or more working areas so that several objects can be built in series before removal of an object is required. In addition, multiple working volumes may be provided so that two or more objects can be fabricated concurrently, or a single object may be fabricated with sequential, overlapping builds within the working volume. Other variations will also be apparent, and may be adapted to use with the process 800 described above.

Many of the above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory, any of which may serve as the controller described above or supplement processing of the controller with additional circuitry. This may also, or instead, include one or more application specific integrated circuits, programmable gate arrays, programmable array logic components, or any other device(s) that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. Thus, the order or presentation of method steps in the description and drawings above is not intended to require this order of performing the recited steps unless a particular order is expressly required or otherwise clear from the context.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. An apparatus comprising:
   a build platform including a surface that is rigid and substantially planar, the surface including a plurality of areas;
   an extruder including a chamber to receive a build material and an extrusion tip that extrudes the build material at a controlled volumetric rate;
   a x-y-z positioning assembly adapted to three-dimensionally position the extrusion tip within the working volume;
   a controller electrically coupled to each of the build platform, the extruder, and the x-y-z positioning assembly, the controller operable to control the build platform, the extruder, and the x-y-z positioning assembly to fabricate an object in three-dimensions from the build material; and
   a plurality of heating elements disposed within the build platform, each one of the plurality of heating elements associated with a corresponding one of the plurality of areas of the surface of the build platform, each one of the plurality of heating elements coupled in a communicating relationship with the controller, wherein the controller is configured to independently control each one of the plurality of heating elements to provide different heating to each one of the plurality of areas of the surface of the build platform.

2. The apparatus of claim 1 wherein at least one of the plurality of heating elements includes a resistive element to convert electrical current into heat.

3. The apparatus of claim 1 wherein at least one of the plurality of heating elements includes a Peltier effect device.

4. The apparatus of claim 1 further comprising at least one cooling element coupled to the controller and configured to provide active cooling to an area of the build platform.

5. The apparatus of claim 1 wherein the plurality of heating elements includes at least one gas heating device.

6. The apparatus of claim 1 further comprising at least one stream of heated gas directed toward the build platform and controllable to heat the build platform.

7. The apparatus of claim 1 further comprising at least one stream of cooled gas directed toward the build platform and controllable to cool the build platform.

8. The apparatus of claim 1 further comprising at least one sensor to detect a temperature of the build platform.

9. The apparatus of claim 1 further comprising at least one radiant heater configured to heat the working volume during a build.

10. The apparatus of claim 1 further comprising at least one radiant heater configured to maintain the object at a fixed, elevated temperature during a build.

11. The apparatus of claim 1 wherein the plurality of heating elements provide independent control over cooling the plurality of areas of the surface of the build platform.

12. The apparatus of claim 1 further comprising a conveyor to controllably move the object out of the working volume.

13. The apparatus of claim 1 wherein the plurality of heating elements are controllable to heat at least one of the plurality of areas of the surface of the build platform to at least about one hundred degrees Celsius.

14. A method comprising:
providing a build platform having a surface that is substantially planar, the surface including a plurality of areas, the build platform passing through a working volume of a three-dimensional printer;
independently controlling a plurality of heating elements for the build platform to provide different heating to each one of the plurality of areas of the surface of the build platform; and
fabricating an object on the build platform, wherein fabricating the object includes creating the object from a number of layers of a material, each one of the number of layers having a two-dimensional shape corresponding to a cross-section of the object.

15. The method of claim 14 further comprising actively cooling the build platform after fabricating the object.

16. The method of claim 14 further comprising moving the object out of the working volume with a conveyor after fabricating the object.

17. A computer program product for controlling a three-dimensional printer, the computer program product comprising computer executable code embodied in a non-transitory computer-readable medium that, when executing on one or more computing devices, performs the steps of:
controlling a three-dimensional printer to fabricate an object on a build platform within a working volume of the three-dimensional printer, the build platform having a surface that is substantially planar, the surface including a plurality of areas, wherein fabricating the object includes creating the object from a number of layers of a material, each one of the number of layers having a two-dimensional shape corresponding to a cross-section of the object; and
independently controlling a plurality of heating elements for the build platform to provide different heating to each one of the plurality of areas of the surface of the build platform.

18. The computer program product of claim 17 further comprising code that performs the step of moving the object out of the working volume with a conveyor after completing a fabrication of the object.

* * * * *